United States Patent
Jeong et al.

(10) Patent No.: US 8,750,821 B2
(45) Date of Patent: Jun. 10, 2014

(54) METHOD AND APPARATUS FOR REPORTING EMERGENCY IN CALL STATE IN PORTABLE WIRELESS TERMINAL

(75) Inventors: Yong-Soo Jeong, Gyeonggi-do (KR); Jin Park, Gyeonggi-do (KR); Min-Ji Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 209 days.

(21) Appl. No.: 13/342,364

(22) Filed: Jan. 3, 2012

(65) Prior Publication Data
US 2012/0171986 A1 Jul. 5, 2012

(30) Foreign Application Priority Data
Jan. 4, 2011 (KR) ................ 10-2011-0000476

(51) Int. Cl.
*H04M 11/00* (2006.01)
(52) U.S. Cl.
USPC .................................. 455/404.1; 379/100.05

(58) Field of Classification Search
USPC ............. 455/404.1, 408, 416, 563; 379/88.25
See application file for complete search history.

(56) References Cited

U.S. PATENT DOCUMENTS

| | | | |
|---|---|---|---|
| 6,661,879 B1 * | 12/2003 | Schwartz et al. ........... 379/88.25 |
| 2003/0046710 A1 * | 3/2003 | Moore ........................... 725/133 |
| 2006/0100880 A1 * | 5/2006 | Yamamoto et al. ............ 704/270 |
| 2007/0249406 A1 * | 10/2007 | Andreasson ................... 455/563 |
| 2007/0265990 A1 * | 11/2007 | Sidhu et al. ................... 705/418 |
| 2011/0158430 A1 * | 6/2011 | Dicks et al. ................... 381/104 |

FOREIGN PATENT DOCUMENTS

| KR | 10-2010-0062172 A | 6/2010 |
|---|---|---|
| KR | 10-2010-0104522 A | 9/2010 |

* cited by examiner

*Primary Examiner* — Nizar Sivji
(74) *Attorney, Agent, or Firm* — Cha & Reiter, LLC (57) ABSTRACT

A method and apparatus for providing telephone conversation information with a called party in a call state to a third party on a network is disclosed. The method comprises acquiring a telephone conversation voice corresponding to a keyword in a call state and transmitting a message regarding a declaration of an emergency to a third party.

11 Claims, 6 Drawing Sheets

METHOD AND APPARATUS FOR REPORTING EMERGENCY IN CALL STATE IN PORTABLE WIRELESS TERMINAL

CLAIM OF PRIORITY

This application claims, pursuant to 35 U.S.C. §119(a), priority to and the benefit of the earlier filing date of, that Korean patent application filed in the Korean Intellectual Property Office on Jan. 4, 2011 and assigned Serial No. 10-2011-0000476, the entire disclosure of which is hereby incorporated by reference.

BACKGROUND OF THE INVENTION

1. Field of the Invention

The present invention relates to the field of wireless communications and more particularly, to a method and apparatus for reporting an emergency in a call state in a portable wireless terminal.

2. Description of the Related Art

Portable wireless terminals, such as mobile terminals (cellular phones), electronic schedulers, and personal complex terminals have become necessities of our modern society based on development of electronic communication industries. The portable wireless terminals have developed into important means of information transmission among different people and parties. Portable wireless terminals provide various multimedia functions in addition to a basic telephone communication function.

However, crimes (e.g., voice-fishing, threat, fraud, stalking, etc.) which abuse the portable wireless terminals are on an increasing trend. These crimes have increased considerably as the portable wireless terminals have become an ever more important element of a user's life. It is desirable to take quick measures corresponding to the crimes to secure, identify and/or capture cell phone attackers.

When a victim receives a threatening telephone call from an attacker, she/he typically terminates a telephone call first. The victim makes a telephone call to a police station and then reports a criminal act to a police officer. The police officer checks the telephone conversation records with the attackers and determines criminal situations and the attacker's locations to start an investigation. The aforementioned post-treatment method has a problem in that an opportunity capable of early securing of evidence that may prove the criminal act and the early arrest of the attacker may be lost.

Thus, there is a need in the industry for a system that provides for a rapid determination of the attacker's location to enable the authorities to quickly collect needed evidence to capture the attacker and prevent future harm.

SUMMARY OF THE INVENTION

An aspect of the present invention is to solve at least the above-mentioned problems and/or disadvantages and to provide at least the advantages described below. Accordingly, an aspect of the present invention is to provide a method and apparatus for reporting a criminal act (or emergency) in real time in a call state in a portable wireless terminal.

Another aspect of the present invention is to provide a method and apparatus for allowing a third party on a network to acquire telephone conversation information when a voice corresponding to a previously defined or registered keyword is acquired in a call state in a portable wireless terminal.

Another aspect of the present invention is to provide a method and apparatus for allowing a third party to participate in a telephone call and intercept telephone conversation contents when an emergency occurs in a call state.

In accordance with an exemplary embodiment of the present invention, a method of reporting an emergency in a call state in a portable wireless terminal is provided. The method includes acquiring a telephone conversation voice corresponding to a corresponding keyword in a call state, and providing a notification of an occurrence of the emergency to a third party.

In accordance with an exemplary embodiment of the present invention, a method for reporting an emergency in a call state in a mobile communication system is provided. The method includes acquiring a telephone conversation voice corresponding to a corresponding keyword in telephone conversation between portable wireless terminals, and intercepting the telephone conversation between the portable wireless terminals.

In accordance with an exemplary embodiment of the present invention, an apparatus for reporting an emergency in a call state in a portable wireless terminal is provided. The apparatus includes a control unit for notifying a third party of the occurrence of an emergency when a telephone conversation voice corresponding to a corresponding keyword is acquired.

In accordance with an exemplary embodiment of the present invention, an apparatus for reporting an emergency in a call state in a mobile communication system is provided. The apparatus includes a system for intercepting a telephone conversation between portable wireless terminals when a telephone conversation voice corresponding to a corresponding keyword is acquired.

In accordance with an exemplary embodiment of the present invention, an apparatus for reporting an emergency in a call state in a mobile communication system is provided. The apparatus includes a terminal for determining the existence of an emergency when a telephone conversation voice corresponding to a corresponding keyword is acquired in a call state, and providing a notification to a third party for intercepting telephone conversation when the emergency determined. In accordance a principle of the invention, an apparatus for capturing a telephone conversation is disclosed. The apparatus comprises a computer in communication with a memory, the memory including code which when accessed by the computer causes the processor to: detect a keyword in a telephone conversation a connection of a third party via a network and providing the third party with access to the telephone conversation, wherein the third party records the telephone conversation.

Other exemplary aspects, advantages and salient features of the invention will become apparent to a person of ordinary skill in the art from the following detailed description, which, taken in conjunction with the annexed drawings, discloses exemplary embodiments of the invention in more detail.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

Throughout the drawings, like reference numerals will be understood to refer to like parts, components and structures.

DETAILED DESCRIPTION

The following description, with reference to the accompanying drawings, is provided to assist a person of ordinary skill in the art with a comprehensive understanding of exemplary embodiments of the invention. The description includes various specific details to assist in that understanding but these details are to be regarded as merely exemplary. Accordingly, those of ordinary skill in the art will recognize that various changes and modifications of the exemplary embodiments described herein can be made without departing from the spirit of the invention and the scope of the appended claims. Also, descriptions of well-known functions and constructions may be omitted for clarity and simplicity so as not to obscure appreciation of the present invention by a person of ordinary skill with such well-known functions and constructions.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims.

It is to be understood that the singular forms "a", "an", and "the" include plural references unless the context clearly dictates otherwise. Thus, for example, reference to "a component surface" typically includes reference to one or more of such surfaces.

By the term "substantially" typically means that the recited characteristic, parameter, or value need not be achieved exactly, but that deviations or variations, including for example, tolerances, measurement error, measurement accuracy limitations and other factors known to those skilled in the art, and may occur in amounts that do not preclude the effect the characteristic was intended to provide.

The present invention described hereinafter relates to a method and apparatus for reporting an emergency in a call state in a portable wireless terminal. More particularly, the present invention relates to a method and apparatus for providing telephone conversation information with a called party to a third party on a network when an emergency occurs in a call state. The telephone conversation information may include a telephone number, telephone conversion contents, a telephone conversation location, etc. A portable wireless terminal according to one embodiment of the present invention requests a user may request that telephone conversation information to be intercepted by an authorized third party when a telephone conversation voice corresponding to a previously defined or registered keyword is acquired in a call state with a called party. The intercept process includes a process for recording telephone conversation contents and a process for acquiring a telephone conversation location. The keyword may be a word or a sentence that a user may issue that informs the third party that a criminal act, or an emergency, is in progress. The portable wireless terminal may store the telephone conversation information. But, it is desirable that the authorized third party also stores the telephone conversation information in an aspect of privacy protection. Actually, it is illegal to record telephone conversation content in some countries. The authorized third party may be a corresponding server or an SOS server of an SOS institution such as a police station or a fire station.

Figure 1:
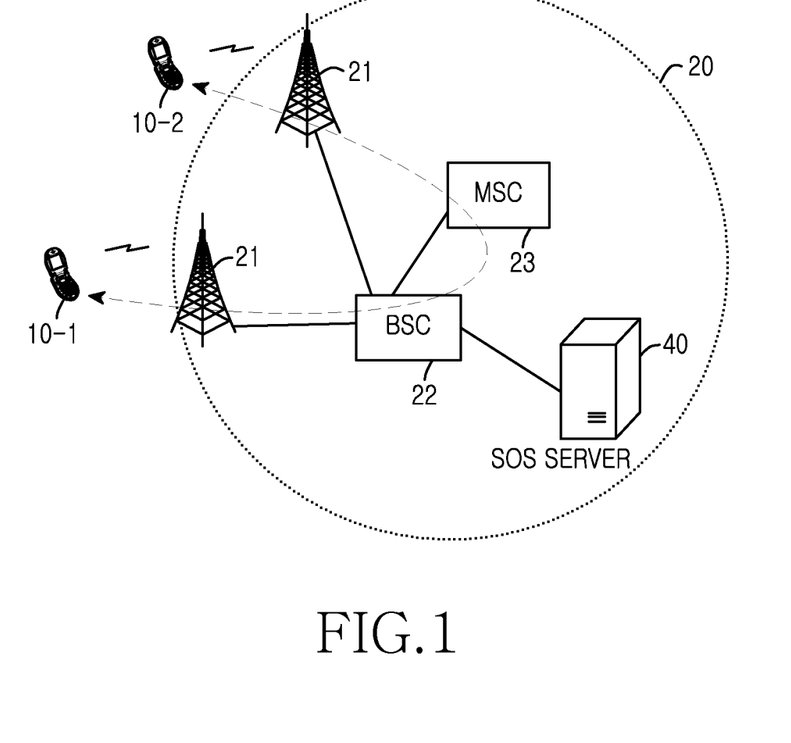
FIG. 1 is an overall network system according to one embodiment of the present invention.

FIG. 1 is an overall network system according to one embodiment of the present invention.

Referring to FIG. 1, the network system according to one embodiment of the present invention includes portable wireless terminals 10-1 and 10-2 and a mobile network 20. The mobile network 20 includes Base Transceiver Subsystems (BTSs) 21, a Base Station Controller (BSC) 22, a Mobile Switching Center (MSC) 23, and an SOS server 40.

Each of the BTSs 21 connects to a corresponding one of the portable wireless terminals 10-1 and 10-2 by a radio interval and connects traffic channels that control the transmission between portable wireless terminals 10-1 and 10-2. The BSC 22 manages a plurality of BTSs 21 and interworks with the MSC 23. The MSC 23 is a key component of the mobile network 20. Also, the MSC 23 controls voice telephone conversation and various additional services, sets channels, and provides a function of connecting several different equipment with external networks.

Each of the BTSs 21 transmits voice data received from a corresponding one of the portable wireless terminals 10-1 and 10-2 to the BSC 22. The BSC 22 transmits the voice data to the MSC 23. The MSC 23 may trace a location of each of the portable wireless terminals 10-1 and 10-2. Also, the MSC 23 may trace a location of each of the portable wireless terminals 10-1 and 10-2 using different networks (Public Switched Telephone Network (PSTN), Internet, private network, etc.) if necessary.

When a previously defined or registered keyword is acquired among telephone conversion contents, the SOS server 40 intercepts the telephone conversation information. The intercepted telephone conversation information may include a telephone number, telephone conversation contents, a telephone conversation location, etc. Any of the portable wireless terminals 10-1 and 10-2, the BTSs 21, the BSC 22, the MSC 23, and the SOS server 40 may acquire a previously defined or registered keyword among the telephone conversation contents. For example, if the portable wireless terminal 10-1 acquires a telephone conversation voice corresponding to a corresponding keyword in a call state with a called party, it transmits an emergency signal to the mobile network 20. When the emergency signal is received, the SOS server 40 starts telephone conversation interception. That is, the SOS server 40 may acquire the telephone number of the current telephone conversation, the telephone conversation contents, and the telephone conversation location from the MSC 23. Here, this telephone conversation interception is lawfully performed. If an emergency signal is generated according to one embodiment of the present invention, it is acknowledged that both of the portable wireless terminal 10-1 and the SOS server 40 agree with the telephone conversation interception. The SOS server 40 may be equipped in an institution, such as a police station or a fire station, or may communicate with another authorized institution. If the emergency signal is received, the SOS server 40 may transmit an emergency generation message to the corresponding institution (e.g., fire department, police department, security office, hospital, etc.). Accordingly, the corresponding institution may quickly know that an emergency is being determined or declared. Also, the SOS server 40 provides the intercepted telephone conversation information to the corresponding institution. Therefore, when a crime using telephone occurs, a quick notification is performed and a post-treatment is easily performed using telephone conversation information acquired in real time.

The keyword may have a text format or a voice format. The keyword may be previously registered in the portable wireless terminal, or may be defined by a user of the portable wireless terminal. For example, the user inputs a text such as an 'account number', and may designate the input text as a keyword. In addition, the user records a term, such as 'spare me,' and may define the recorded voice as a keyword. Accordingly, the portable wireless terminal must recognize the voice. That is, the portable wireless terminal may acquire a telephone conversation voice corresponding to a keyword of a text format in a call state. Furthermore, the portable wireless terminal may acquire the same voice as a keyword of a voice format in a call state.

Figure 2:
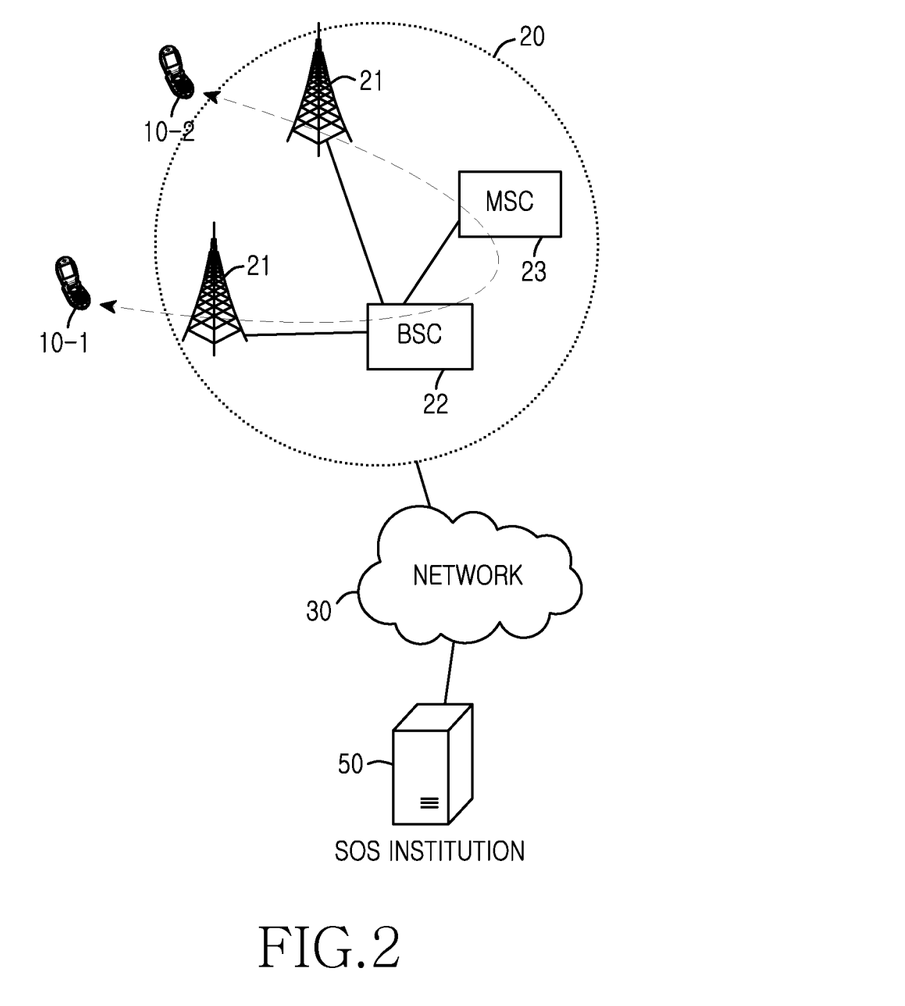
FIG. 2 is an overall network system according to one embodiment of the present invention.

FIG. 2 is an overall network system according to one embodiment of the present invention.

Referring to FIG. 2, the network system according to one embodiment of the present invention includes portable wireless terminals 10-1 and 10-2, a mobile network 20, a network 30, and an SOS institution 50. The mobile network 20 may include BTSs 21, a BSC 22, and an MSC 23, as previously described.

Each of the BTSs 21 connects to a corresponding one of the portable wireless terminals 10-1 and 10-2 by a radio interval and connects traffic channels that control the portable wireless terminals 10-1 and 10-2. The BSC 22 manages a plurality of BTSs 21 and interworks with the MSC 23. The MSC 23 is a key component of the mobile network 20. Also, the MSC 23 controls voice telephone conversation and various additional services, sets channels, and provides a function of connecting several different equipment with external networks.

The network 30 may be a PSTN or the Internet. The SOS institution 50 may be a fire station or a police station or other similar authorized station for receiving the transmitted signal.

Each of the BTSs 21 transmits voice data received from a corresponding one of the portable wireless terminals 10-1 and 10-2 to the BSC 22. The BSC 22 transmits the voice data to the MSC 23. The MSC 23 may trace a location of each of the portable wireless terminals 10-1 and 10-2. Also, the MSC 23 may trace a location of each of the portable wireless terminals 10-1 and 10-2 using different networks (PSTN, Internet, private network, etc.) if necessary.

When a previously defined or registered keyword is acquired among telephone conversion contents, the MSC 23 intercepts the telephone conversation information. The intercepted telephone conversation information may include a telephone number, telephone conversation contents, a telephone conversation location, etc. In addition, the MSC 23 may be replaced with the SOS server 40 shown in FIG. 1. Thus, rather than a MSC 23, the system may include the SOS server 40 to collect the telephone conversation information.

Any of the portable wireless terminals 10-1 and 10-2, the BTSs 21, the BSC 22, and the MSC 23 may acquire a previously defined or registered keyword among the telephone conversation contents. For example, if the portable wireless terminal 10-1 acquires a telephone conversation voice corresponding to a registered keyword in a call state with a called party, terminal 10-1 transmits an emergency signal to the MSC 23. When the emergency signal is received, the MSC 23 starts a telephone conversation interception. That is, the MSC 23 may acquire the telephone number, the telephone conversation contents, and the telephone conversation location. In addition, when the emergency signal is received, the MSC 23 starts a telephone conversation recording.

Subsequently, the MSC 23 provides the intercepted telephone conversation information to the SOS institution 50 through the corresponding network 30. The SOS institution 50 may quickly perform a post-treatment analysis using the provided telephone conversation information. When the MSC 23 requests a communication connection with the SOS institution 50, it may transmit an emergency generation message. Accordingly, the SOS institution 50 may quickly know that an emergency is being determined.

Figure 3:
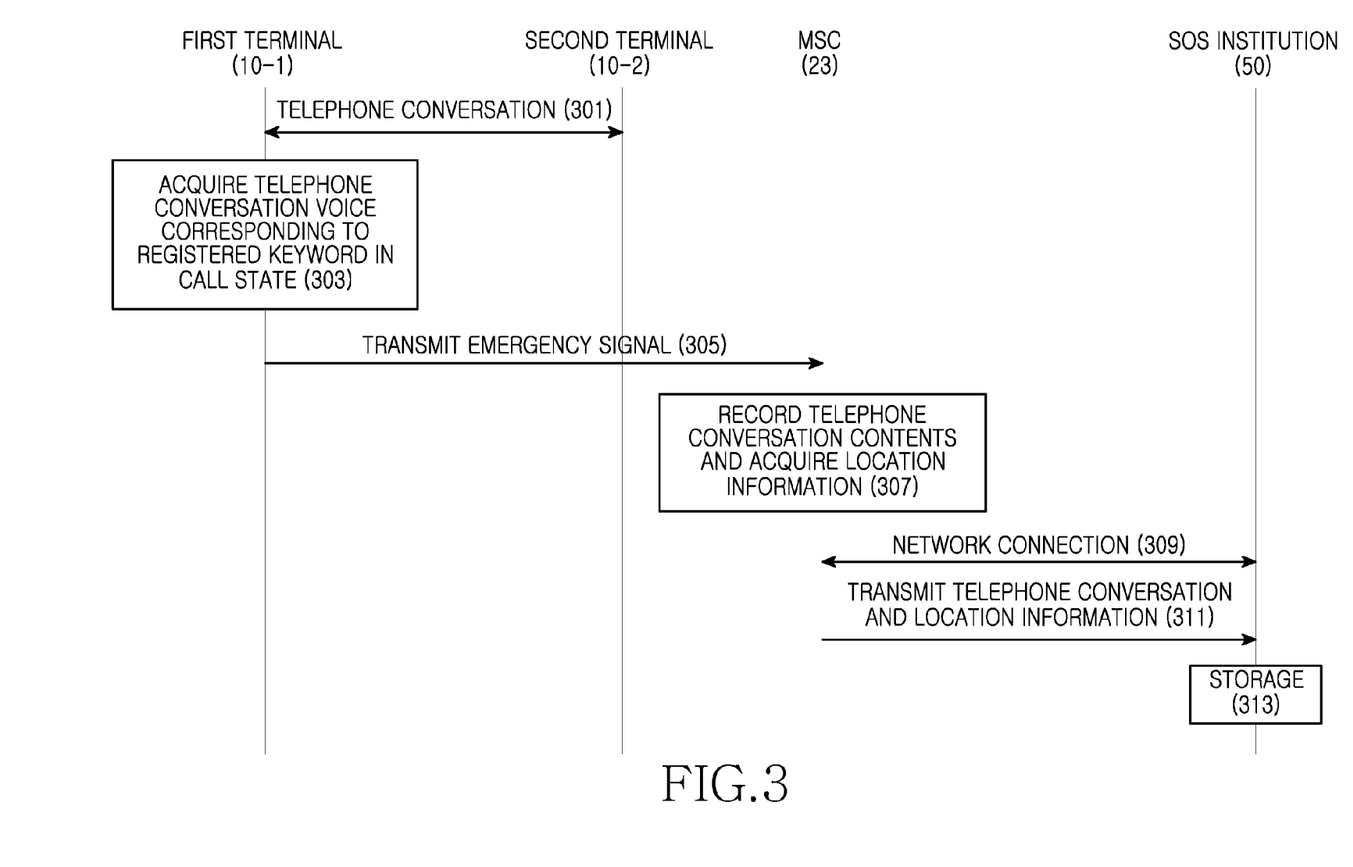
FIG. 3 is a communication flowchart among respective devices shown in FIG. 2 according to one embodiment of the present invention.

FIG. 3 is a communication flowchart among respective devices shown in FIG. 2 according to one embodiment of the present invention.

Referring to FIG. 3, when a first terminal 10-1 is in a call state with a second terminal 10-2 (step 301), the first terminal 10-1 acquires a telephone conversation voice corresponding to a registered keyword (step 303). The telephone conversation voice may include all of a voice output from the first terminal 10-1 and a voice output from the second terminal 10-2. If the telephone conversation voice corresponding to the registered keyword is acquired, the first terminal 10-1 transmits an emergency signal to an MSC 23 (step 305). When the emergency signal is received, the MSC 23 starts a telephone conversation recording and acquires location information of the first and second terminals 10-1 and 10-2 (step 307). Subsequently, the MSC 23 is connected with an SOS institution 50 through a network (step 309). When the MSC 23 is connected with the SOS institution 50 through the network, the MSC 23 may transmit an emergency generation message together with the telephone conversation information to the SOS institution 50. Accordingly, the SOS institution 50 may quickly know that an emergency is being declared. The MSC 23 continuously transmits the previously acquired telephone conversation contents and location information to the SOS institution 50 (step 311). The SOS institution 50 stores the transmitted telephone conversation contents and location information (step 313). Therefore, when an emergency is determined in a call state, the SOS institution 50 may quickly perform a post-treatment by performing a quick notification and easily acquiring telephone conversation information about the emergency.

Figure 4:
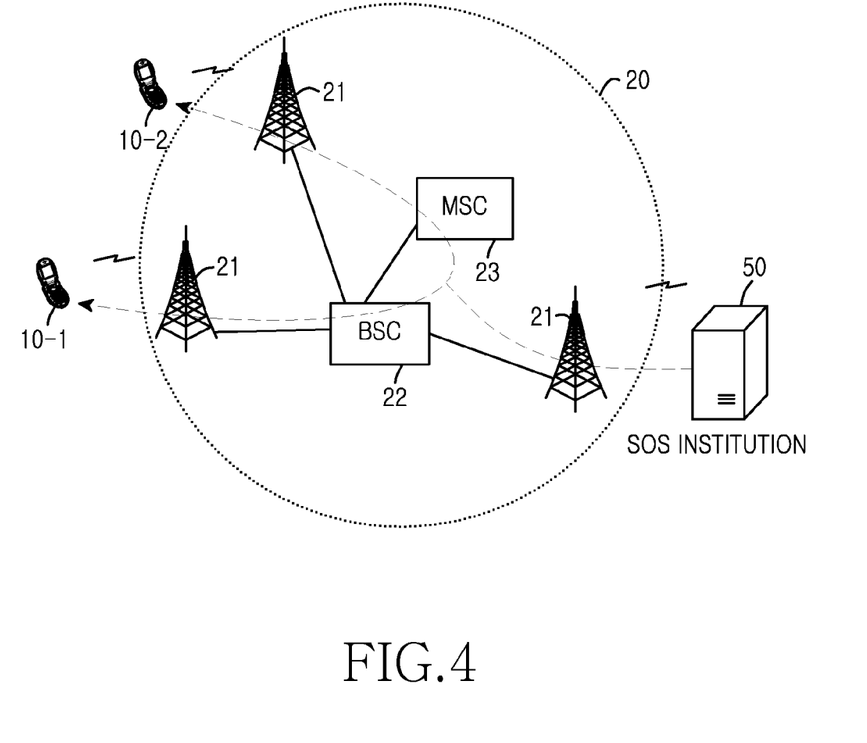
FIG. 4 is an overall network system according to one embodiment of the present invention.

FIG. 4 is an overall network system according to one embodiment of the present invention.

Referring to FIG. 4, the network system according to one embodiment of the present invention includes portable wireless terminals 10-1 and 10-2, an SOS institution 50, and a mobile network 20.

The mobile network 20 includes BTSs 21, a BSC 22, and an MSC 23.

Each of the BTSs 21 connects to a corresponding one of the portable terminals 10-1 and 10-2 by a radio interval and connects traffic channels that control the portable terminals 10-1 and 10-2. The BSC 22 manages a plurality of BTSs 21 and interworks with the MSC 23. The MSC 23 is a key component of the mobile network 20. Also, the MSC 23 controls voice telephone conversation and various additional services, sets channels, and provides a function of connecting several different equipment with external networks.

Each of the BTSs 21 transmits voice data received from a corresponding one of the portable terminals 10-1 and 10-2 to the BSC 22. The BSC 22 transmits the voice data to the MSC 23. The MSC 23 may trace a location of each of the portable terminals 10-1 and 10-2. The MSC 23 may also trace a location of each of the portable terminals 10-1 and 10-2 using different networks (PSTN, Internet, private network, etc.) if necessary.

When a previously defined or registered keyword is acquired among telephone conversion contents, the SOS institution 50 intercepts telephone conversation information. The intercepted telephone conversation information may include a telephone number, telephone conversation contents, a telephone conversation location, etc. Any one of the portable wireless terminals 10-1 and 10-2, the BTSs 21, the BSC 22, and the MSC 23 may acquire a previously defined or registered keyword among the telephone conversation contents. For example, if the portable wireless terminal 10-1 acquires a telephone conversation voice corresponding to a corresponding keyword in a call state with a called party, the terminal transmits an emergency signal to the mobile network 20. When the emergency signal is received, the mobile network 20 allows the SOS institution 50 to participate in a traffic channel which is currently active (opening) between the portable terminals (between a calling terminal and a called terminal). The SOS institution 50 may participate in the currently active communication channel as a third party by a 3-way call type configuration. When the mobile network 20 requests 3-way call participation to the SOS institution 50, the mobile network may transmit an emergency generation message to the SOS institution 50. Accordingly, the SOS institution 50 may quickly know that an emergency is being declared. If a 3-way call is performed, the SOS institution 50 may intercept or may check a telephone conversation between the two terminals 10-1 and 10-2. Also, the mobile network 20 provides telephone conversation location information to the SOS institution 50. Therefore, when a crime using telephone occurs, the SOS institution 50 may quickly perform a post-treatment.

Further, as another example, the SOS institution may be informed through a second channel of the issuance of an emergency signal via the mobile network from any one of the portable wireless terminals 10-1 and 10-2, the BTSs 21, the BSC 22, and the MSC 23, which detect and acquire a previously defined or registered keyword among the telephone conversation contents.

Figure 5:
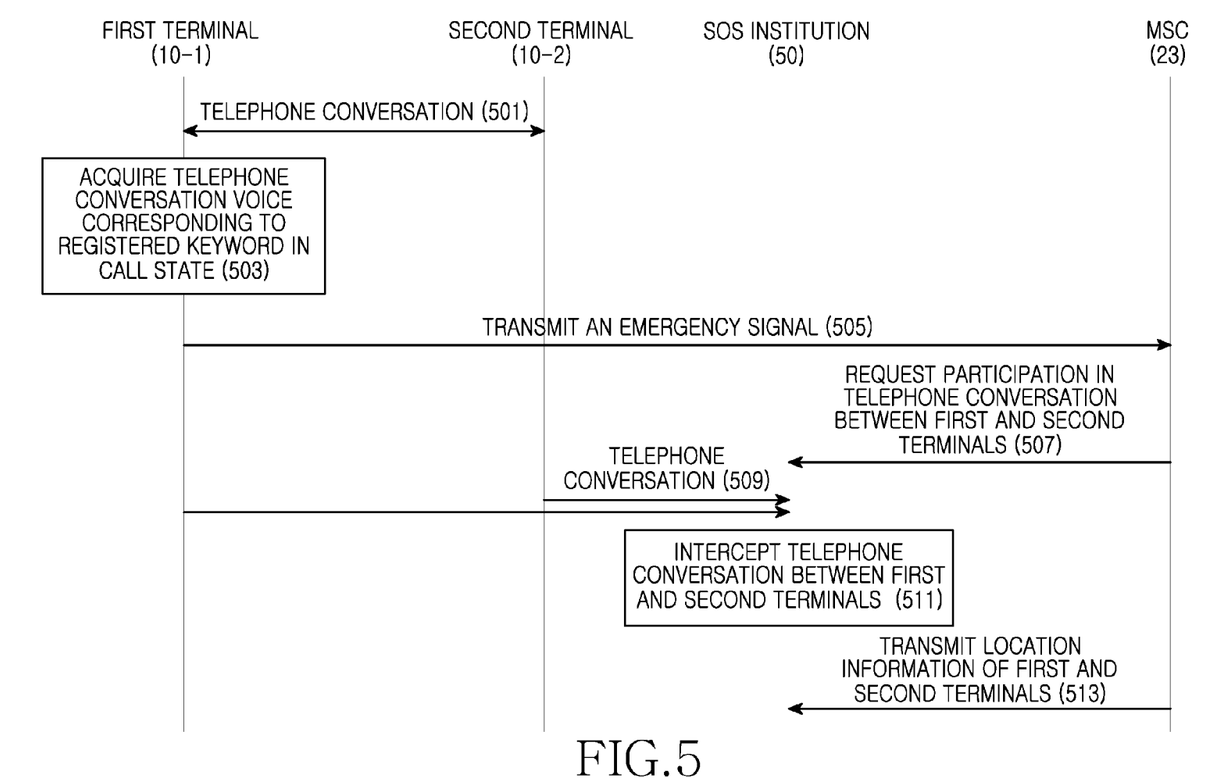
FIG. 5 is a communication flowchart among respective devices shown in FIG. 4 according to one embodiment of the present invention.

FIG. 5 is a communication flowchart among respective devices shown in FIG. 4 according to one embodiment of the present invention.

Referring to FIG. 5, when a first terminal 10-1 is in a call state with a second terminal 10-2 (step 501), the first terminal acquires a telephone conversation voice corresponding to a registered keyword (step 503). When the telephone conversation voice corresponding to the registered keyword is acquired, the first terminal 10-1 transmits an emergency signal to an MSC 23 (step 505). When the emergency signal is received, the MSC 23 requests participation in a telephone conversation between the first and second terminals 10-1 and 10-2 to the SOS institution 50 (step 507). When the MSC 23 transmits an emergency generation message, the SOS institution 50 may quickly know that an emergency is being declared. Subsequently, the SOS institution 50 participates in a 3-way call in response to the request (step 509), and intercepts the telephone conversation between the first and second terminals 10-1 and 10-2 (step 511). Furthermore, the SOS institution 50 may receive location information of the first and second terminals 10-1 and 10-2 from the MSC 23.

As mentioned above, the portable wireless terminal according to one embodiment of the present invention determines that a current state of a call is in an emergency state when a telephone conversation voice corresponding to a registered keyword is acquired in a call state and outputs a signal for allowing a third party to record telephone conversation contents. In one aspect the telephone conversation and the telephone conversation information is stored by an authorized third party. Also, the present invention may quickly perform a post-treatment for a crime using the saved telephone conversation and telephone conversation information. For example, if a victim says a previously registered keyword when they receive a threatening telephone call, the threatening telephone call is immediately reported to a police station or other authorized agency. Also, telephone conversation information necessary for performing a post-treatment may be provided in real time. Also, as stated above, a police station may intercept telephone conversation information between an attacker and the victim by a 3-way call type configuration. It is thus possible for people with limited ability, e.g., children, the sick and/or the elder, to declare an emergency so that an appropriate third party may be notified of an emergency condition arising.

Figure 6:
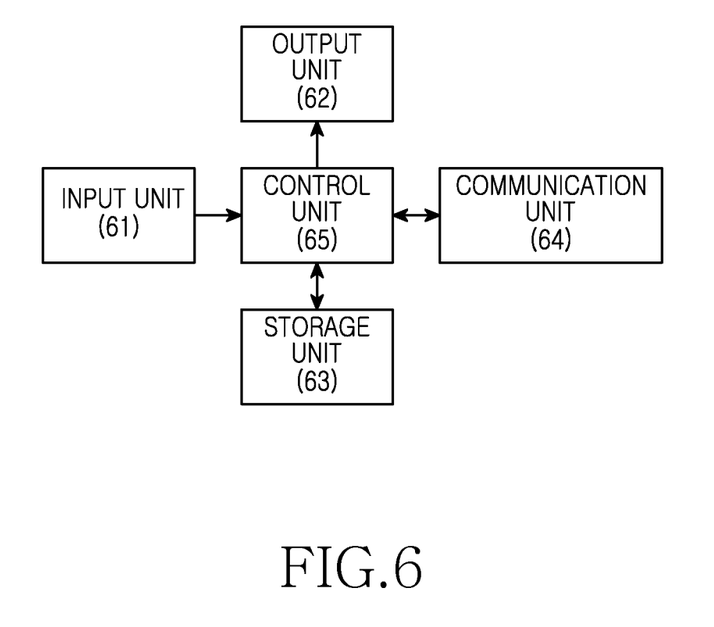
FIG. 6 is a block diagram of a portable wireless terminal according to one embodiment of the present invention.

FIG. 6 is a block diagram of a portable wireless terminal according to one embodiment of the present invention. The portable wireless terminal may be a cellular phone, a Personal Communication Service (PCS), a Personal Digital Assistant (PDA), an IMT2000 terminal, a 4 G terminal, etc.

Referring to FIG. 6, the portable wireless terminal according to one embodiment of the present invention includes an input unit 61 for providing an input signal. The input unit may be a keypad, that provides a textual input, or microphone that provides a voice input, an output unit 62 for providing an output. The output unit may be a voice output device that provides an audio signal or a display device that provides a visual signal. A storage unit 63 is for storing data, a communication unit 64 for communication, and a control unit 65 for controlling an overall operation of the terminal.

The input unit 61 outputs a signal according to an input of a user to a control unit 65. The output unit 62 outputs voice data or display data, corresponding to an input signal, according to control of the control unit 65.

The storage unit 63 stores a programs that control an overall operation of the portable wireless terminal and various data input and output data when a control operation of the portable wireless terminal is performed. Particularly, the storage unit 63 stores keywords that are defined, or previously registered, by the user. As disclosed above, the keyword may be a standard for determining an emergency in a call state, or may be selected by the user. The communication unit 64 performs wire or wireless communication under control of the control unit 65.

The control unit 65 controls an overall operation of the portable wireless terminal. For example, the control unit 65 performs processes and control for voice telephone conversation and data communication. In addition to a general function, the control unit 65 transmits a signal for allowing an authorized third party to start interception of telephone conversation information when a voice corresponding to a corresponding keyword is acquired (detected) in a call state with a called party. As mentioned above, the third party may be in communication over a mobile network or an SOS institution on a corresponding network.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

In conclusion, a method and apparatus for reporting an emergency in a call state in a portable wireless terminal according to one embodiment of the present invention performs post-treatment by securing evidence of a crime using telephone in real time and tracking and reporting a location of an attacker (or a person in an emergency).

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A method of reporting an emergency in a call state in a portable wireless terminal, the method comprising:
    acquiring a voice keyword in at least one of the telephone conversation voices of a telephone conversation in a call state;
    determining an occurrence of the emergency based on the acquired voice keyword; and
    providing a notification to a third party when the emergency is determined and a request to record the telephone conversation voices to the third party as the telephone conversation is concurrently occurring.

2. A method of reporting an emergency in a call state in a mobile communication system, the method comprising:
    acquiring a voice keyword in at least one of the telephone voices of a telephone conversation between portable wireless terminals;
    indicating the emergency to a third party connected to a corresponding network in view of the acquired voice keyword;
    intercepting the telephone conversation between the portable wireless terminals in view of the indication of the emergency;
    providing information of the intercepted telephone conversation to the third party; and
    recording the telephone conversation voices in the third party as the telephone conversation is concurrently occurring.

3. An apparatus for reporting an emergency in a call state in a portable wireless terminal, the apparatus comprising:
    a control unit for:
        receiving notification of a detection of a voice keyword within at least one of the telephone voices in a telephone conversation between two parties;
        opening a communication channel to an authorized third party upon detection of the voice keyword; and
        providing telephone conversation information to the authorized third party, wherein the authorized third party is provided access to the telephone conversation and providing a request to record the telephone conversation voices of the telephone conversation the authorized third party as the telephone conversation is concurrently occurring.

4. A system for reporting an emergency in a call state in a mobile communication system, the system comprising:
    an apparatus for intercepting a telephone conversation between portable wireless terminals when a voice keyword is detected in at least one of the telephone conversation voices of the telephone conversation, the apparatus comprising:
        a control unit for:
            receiving the voice keyword,
            establishing a communication link with an authorized third party in response to the received voice keyword; and
            providing the authorized third party with telephone conversation information, and access to the telephone; and
        the third party for:
        receiving the telephone conversation information; and
        recording the telephone conversation voices for the authorized third party as the telephone conversation is concurrently occurring.

5. A system for reporting an emergency in a call state in a mobile communication system, the system comprising:
    a terminal for indicating the emergency when a corresponding voice keyword is detected in at least one of the telephone conversation voices of a telephone conversation in a call state;
    a communicator for communicating an emergency to a third party over a network;
    the third party for intercepting the telephone conversation when the emergency is indicated from the terminal, and
    the third party for recording the telephone voices of the intercepted telephone as the telephone conversation is concurrently occurring.

6. The apparatus of claim 5, wherein the third party participates in a traffic channel by opening a 3-way call channel.

7. An apparatus for capturing a telephone conversation comprising:
    a computer in communication with a memory, the memory including code which when accessed by the computer causes the processor to:
        detect a voice keyword in at least one of the telephone conversation voices of the telephone conversation;
        request a connection of a third party via a network in response to the detected voice keyword; and
        provide the third party with access to the telephone conversation, wherein the third party records the telephone conversation voices as the telephone conversation concurrently occurs.

8. The apparatus of claim 7, wherein the connection to the third party is through a separate channel.

9. The apparatus of claim 7, wherein access to the telephone conversation by the third party is through a 3-way call.

10. The apparatus of claim 9, wherein the 3-way call is requested by the third party.

11. The apparatus of claim 9, wherein the 3-way call is requested in response to the detected voice keyword.

* * * * *

UNITED STATES PATENT AND TRADEMARK OFFICE
CERTIFICATE OF CORRECTION

PATENT NO. : 8,750,821 B2
APPLICATION NO. : 13/342364
DATED : June 10, 2014
INVENTOR(S) : Yong-Soo Jeong et al.

Page 1 of 1

It is certified that error appears in the above-identified patent and that said Letters Patent is hereby corrected as shown below:

In the Claims

Column 10, Claim 3, Line 2 should read as follows:
--…telephone conversation to the…--

Signed and Sealed this
Fifth Day of August, 2014

Michelle K. Lee
*Deputy Director of the United States Patent and Trademark Office*